United States Patent [19]

Clarke

[11] Patent Number: 5,026,215

[45] Date of Patent: * Jun. 25, 1991

[54] METHOD OF GROUTING FORMATIONS AND COMPOSITION USEFUL THEREFOR

[75] Inventor: William J. Clarke, Ridgewood, N.J.

[73] Assignee: Geochemical Corporation, Ridgewood, N.J.

[*] Notice: The portion of the term of this patent subsequent to Jan. 30, 2007 has been disclaimed.

[21] Appl. No.: 278,970

[22] Filed: Dec. 2, 1988

[51] Int. Cl.$^5$ .......................... E02D 3/12; C04B 7/14; C09K 17/00

[52] U.S. Cl. .................................. 405/266; 405/267; 405/269; 166/293; 106/714; 106/789; 106/790

[58] Field of Search ................ 52/744; 166/292, 293, 166/294, 295; 106/76, 90, 95, 117, 789, 790, 714; 405/266, 267, 269

[56] References Cited

U.S. PATENT DOCUMENTS

| | | | |
|---|---|---|---|
| 2,646,360 | 7/1953 | Lea et al. | 106/90 |
| 3,335,018 | 8/1962 | Peeler et al. | 106/76 |
| 4,054,460 | 10/1977 | Buchet et al. | 106/117 |
| 4,174,227 | 11/1979 | Tomic | 106/85 |
| 4,302,912 | 10/1981 | Forss | 106/117 |
| 4,402,749 | 9/1983 | Hall | 106/76 |
| 4,415,364 | 11/1983 | Naito | 106/84 |
| 4,443,260 | 4/1984 | Miyoshi | 106/109 |
| 4,761,183 | 8/1988 | Clarke | 106/117 |
| 4,897,119 | 1/1990 | Clarke | 106/790 |

FOREIGN PATENT DOCUMENTS

| | | |
|---|---|---|
| 8603482 | 6/1986 | Int'l Pat. Institute. |
| 57-67051 | 4/1982 | Japan. |
| 57-16418 | 6/1982 | Japan. |
| 1038315 | 8/1983 | U.S.S.R.. |
| 1070700 | 6/1967 | United Kingdom. |

OTHER PUBLICATIONS

Moller et al, "Ultrafine Cement Pressure Grouting to Control Ground Water in Fractured Granite Rock", SP83-8, American Concrete Institute, Kansas City, Sep. 29, 1983.

W. J. Clarke, "Performance Characteristics of Microfine Cement", Preprint 84-023, Am. Soc. Civil Eng. Convention, Atlanta, Ga., May 14, 1984.

W. J. Clarke, "Microfine Technology", 23rd Intl. Cement Seminar, Atlanta, Ga, Dec. 6-9, 1987.

Sergei Boldyrev and Arsian Tumenex, "In the USSR: Progress in Product of Binders and Concrete", PIt & Quarry, Sep. 1984, pp. 68-69.

"Ultra-Superfine Grout Material-Onoda MC", Onoda Cement Co., 1-1-7, Toyosu, Koto-Ku, Tokyo, Japan, Note 10-79 at bottom of last page (28).

Lea et al., Chemistry of Cement and Concrete, Edward Arnold (Publishers) LTD, London (1956), p. 470.

*Primary Examiner*—Mark L. Bell
*Assistant Examiner*—Anthony J. Green
*Attorney, Agent, or Firm*—Ladas & Parry

[57] ABSTRACT

A method of grouting formations with a cementitious material comprising microfine ground slag is useful for stabilizing and strenghtening soil and rock formations as well as underground structures associated with buildings, tunnels and dams. A composition is provided which comprises water, a dispersant, slag and an accelerator to activate the slag. The method and composition are particularly useful for preventing permeation of water such as for grouting dam curtains and containing and stabilizing hazardous wastes including nuclear waste material.

20 Claims, 2 Drawing Sheets

METHOD OF GROUTING FORMATIONS AND COMPOSITION USEFUL THEREFOR

BACKGROUND OF THE INVENTION

1. Field of the Invention

This invention relates to a method of grouting formations. The method is useful for stabilizing and strengthening soil and rock formations as well as underground structures associated with buildings, tunnels and dams. The invention also relates to a composition suitable for use in the method of the invention. The method and composition of the invention are particularly useful for preventing permeation of water and therefore are especially useful in grouting dam curtains and containing and stabilizing hazardous wastes including nuclear waste material.

2. Description of the Prior Art

The present method utilizes a microfine (ultrafine) ground slag as a component of an economical grouting composition having an excellent combination of properties for the above-mentioned uses. It has earlier been proposed in D. W. Moller, H. L. Minch, J. P. Welsh, "Ultrafine Cement Pressure Grouting to Control Ground Water in Fractured Granite Rock" ACI Proceedings, SP 83-8, Fall Convention Kansas City, 1983, and in W. J. Clarke, "Performance Characteristics of Microfine Cement", ASCE preprint 84-023, Geotechnical Conference, Atlanta, May 14-18, 1984, (the diclosures of both of these publications being incorporated herein by reference), to use microfine (ultrafine) ground cement for underground strengthening and water control. The microfine cement proposed for such use was a coground combinatin of slag and portland cement having fineness properties of a specific surface area of 8,880 $cm^2/g$ and a grain size of about 50% of particles below about 4 micrometers.

The use of more finely divided slag having a specific surface area greater than 9,500 $cm^2/g$ in a composition for stabilizing and strengthening formations is described in U.S. Pat. No. 4,761,183 granted on Aug. 2, 1988 to the present applicant, the disclosure of which is incorporated herein by reference.

Forss U.S. Pat. No. 4,306,912 issued on Dec. 22, 1981, describes the activation of slag by use of an accelerator comprising sodium hydroxide.

Copending U.S. application Ser. No. 07/142,464, filed Jan. 11, 1988 by the present applicant, (the disclosure of which is incorporated herein by reference), describes dispersants useful for ultrafine ground slag grouting compositions.

SUMMARY OF THE INVENTION

According to the present invention there is provided a method of grouting formations, which comprises injecting into a formation a composition comprising a particulate slag, said composition comprising:

(a) water;

(b) at least one dispersant in an amount effective to disperse the particles of said particulate slag;

(c) as said particulate slag, a microfine slag having a specific surface area greater than about 9,500 $cm^2/g$, with less than 3 wt. percent of the particles of said slag being larger than 7.8 micrometers in diameter; the proportions of water and slag being within a water to slag weight ratio range of between 0.5:1 and 10:1, and (d) an accelerator in an amount effective to provide hydraulic reactivity to said slag.

Also provided according to the present invention is a grouting composition comprising a particulate slag, said composition comprising:

(a) water;

(b) at least one dispersant in an amount effective to disperse the particles of said particulate slag;

(c) as said particulate slag, a microfine slag having a specific surface area greater than about 9,500 $cm^2/g$, with less than 3 wt. percent of the particles of said slag being larger than 7.8 micrometers in diameter; the proportions of water and slag being within a water to slag weight ratio of between 0.5:1 and 1:1; and (d) an accelerator in an amount effective to provide hydraulic reactivity to said slag.

Further provided according to the present invention is a grouting composition comprising a particulate slag, said composition comprising:

(a) water;

(b) at least one dispersant in an amount effective to disperse the particles of said particulate slag;

(c) as said particulate slag, a microfine slag having a specific surface area greater than about 9,500 $cm^2/g$, with less than 3 wt. percent of the particles of said slag being larger than 7.8 micrometers in diameter; the proportions of water and slag being within a water to slag weight ratio range of between 0.5:1 and 10:1; and (d) an accelerator in an amount effective to provide hydraulic reactivity to said slag; said composition having been prepared by mixing in sequence (a) with (b) to form a first mixture, then adding (c) to form a second mixture, then adding (d) to said second mixture, and subjecting the resulting composition to strong agitation.

Additionally provided according to the present invention is a grouting composition comprising a particulate slag, said composition comprising:

(a) water;

(b) at least one dispersant in an amount effective to disperse the particles of said particulate slag;

(c) as said particulate slag, a microfine slag having a specific surface area greater than about 9,500 $cm^2/g$, with less than 3 wt. percent of the particles of said slag being larger than 7.8 micrometers in diameter; the proportions of water and slag being within a water to slag weight ratio range of between 0.5:1 and 10:1; and (d) sodium hydroxide in an amount effective to provide hydraulic reactivity to said slag, said amount being within the range of 5% to 10% by weight of slag component (c).

The present invention also provides a formation which has been grouted in accordance with the method of the present invention.

There is a need to provide a method of grouting formations which achieves high permeation of grout into the formation with a grout which has desired setting, hardening and settlement properties.

Because of the large quantities of grouting composition which must be employed when used to stabilize or strengthen formations or to contain water in such formations, the grouting compositions not only must possess the desired combination of properties, but also needs to be economical.

The present invention provides a method of grouting which enables the sealing of a formation such that the formation attains a very low permeability to water and other fluids and thus is useful for such applications as stabilizing and containing hazardous waste. Compositions used in the present invention have an unusual ability to penetrate such formations and have desirable characteristics of setting and hardening time. These compositions also are economical and nonpolluting, so that they may be used in containment of hazardous waste without adding to the problem.

DESCRIPTION OF THE PREFERRED EMBODIMENTS

The following Table 1 illustrates examples of the chemical composition of portland cement, M5 slag/cement and M1 slag.

TABLE 1

|  | PORTLAND | M5 | M1 |
|---|---|---|---|
| $SiO_2$ | 22. | 30.6 | 35.4 |
| $Al_2O_3$ | 5.2 | 12.4 | 16. |
| $Fe_2O_3$ | 3.2 | 1.1 | 0.3 |
| CaO | 65.2 | 48.4 | 43.3 |
| MgO | 1.3 | 5.8 | 3.5 |
| $SO_3$ | 1.9 | 0.8 | 0.3 |

Figure 1:
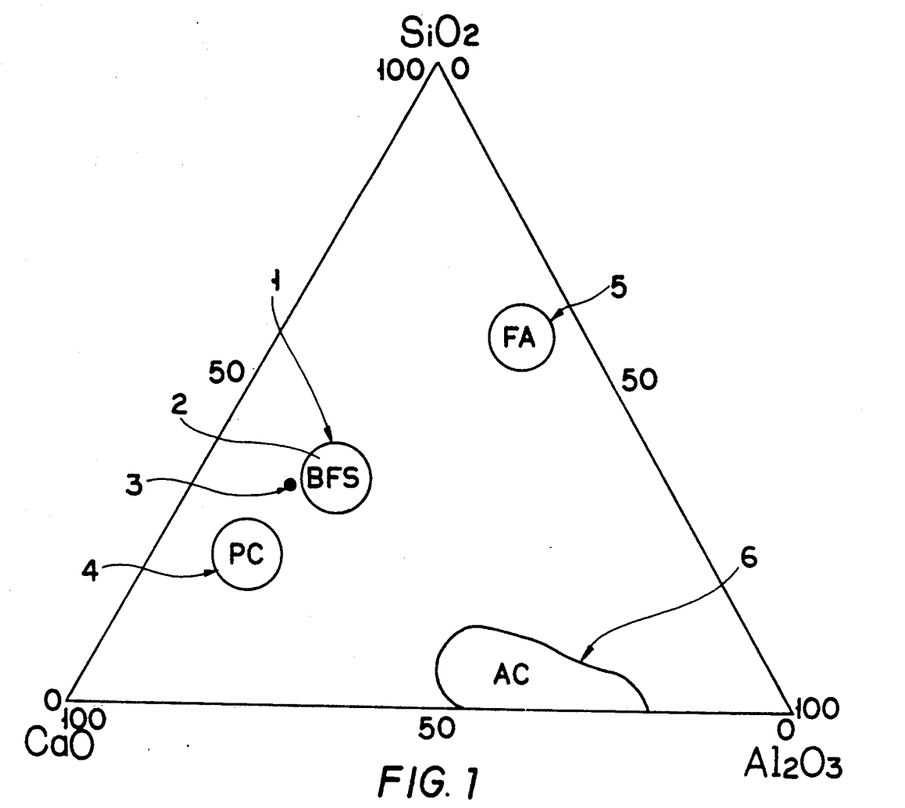
FIG. 1 is a ternary phase diagram showing the relative proportions of calcium, aluminum and silicon oxides in cements, slag and related products.

As is shown in Table 1 and in the ternary diagram of FIG. 1, portland cement is high in calcium oxide and low in silicon dioxide while M1 slag contains a lower content of calcium oxide and a higher content of silicon dioxide. The composition of M5 slag/cement is between that of portland and M1 slag.

The major advantage of microfine (ultrafine) cement over portland is the ability to permeate fine sands and finely cracked rock. M1 and M5 permeate fine sands while portland does not permeate coarse sand. This provides the justification for using microfine cement for permeation grouting dam curtains, stabilizing hazardous wastes and containment of nuclear wastes.

Permeation testing has showed that M1 microfine cement permeates fine sand at 3 times the volume of M5. This indicates that particulate grouts with particle size one third the fine sand openings operate like solution grouts where most of the particles pass through the sand.

Low viscosity is required for fast permeation of the microfine cements. This is provided by higher water/cement weight ratios (above 1:1) and the use of dispersants. The viscosity of all water ratios of M1 or of M5 are lower than portland. At 2:1 water to cement ratio the viscosity of M1 and of M5 is 7 and 9 centipoises, respectively. Lower water/cement (WC) ratios (water below 1:1) are usable in coarser formations using higher pressure injection to obtain low formation permeability for hazardous waste containment.

Permeability of neat microfine and portland cements were laboratory tested by taking samples of hazardous waste water and determining the permeability of the neat (no sand content) cement to the waste water. Permeability rates through M1 are very low at $10^{-9}$ cm/sec after 15,000 minutes. M5 gave almost $10^{-9}$ and portland gave lower than $10^{-7}$ cmsec permeability. These low permeability rates indicate that M1, M5 or M1 plus M3 (microfine ground portland) microfine cements may be used to contain nuclear wastes and stabilize hazardous waste plumes.

The grouting composition used in the present invention comprises an ultrafine (microfine) slag, water in which the slag is dispersed, a dispersant and an accelerator which increases the hydraulic reactivity of the slag.

The ultrafine slag is a cementitious material (CM) having a specific surface area (SSA) greater than 9,500, preferably greater than 11,000 and most preferably greater than 13,000 or 14,000 square centimeters per gram and, by weight, less than 3%, preferably less than 1.5% and most preferably no particles of the slag larger than 7.8 micrometers in diameter. (The surface area and particle size are measured by the use of the Microtrac ® instrument further described hereinbelow.)

An optional cementitious material in the composition is cement having an SSA greater than 10,000, preferably greater than 11,000, with, by weight, less than 16%, preferably less than 7% and most preferably less than 3% of particles of the cement larger than 7.8 micrometers in diameter as measured by the Microtrac ® instrument. The preferred optional cement is portland cement. When used, preferably the optional cement has as SSa of at least about 11,000 cm²/g and is mixed with ultrafine slag having an SSA of at least about 14,000 cm²/g, the mixture having an SSA of at least about 12,000 cm²/g.

The hydration of slag differs from that of portland cement in many aspects. The most striking difference is that slag powder is a homogenous material (glass) with a rather uniform reactive surface, while clinker powder is largely inhomogeneous. The clinker powder is composed of small areas of various minerals with highly different solubilities and reactivities. The reaction with water is highly exothermic and the hydrated structure is built up from a needle-like structure. The reaction between slag-glass and water is only slightly exothermic, and the hydrated structure is built up from a rather homogeneous mass. To be able to reach high early strength the particles in a hydrating body containing slag need to be very close. One way this is made possible is by reducing water content in all types of slag-bearing hydrating bodies.

The WC weight ratio in the present invention is from 0.5:1 to 10:1. For low formation permeability in water control and hazardous waste containment a WC ratio of 0.5:1 to 2:1 is employed. For formation strengthening applications a WC ratio of 1:1 to 10:1 is preferred.

Additional materials in the grout are a dispersant, and accelerator and optional additives, the amounts of these described below being in weight percent solids based on the weight of cementitious material (CM) unless otherwise noted.

An effective amount of dispersant to disperse the CM may be up to 2%, and is preferably 0.1% to 1%, more preferably 0.2% to 0.5%.

To obtain the combined properties desired in the method of the present invention, it is essential to include an accelerator, in an effective amount to initiate or give the ultrafine slag sufficient hydraulic reactivity so that it sets and hardens in desired times, depending on the proposed applications. The accelerator may comprise an alkali or alkaline earth oxide, hydroxide or salt, which imparts the desired hydraulic reactivity to the ultrafine slag, or may comprise any other substance which is effective to provde or improve the hydraulic reactivity of the slag. NaOH is a preferred accelerator, particularly when used in an amount of 5 to 10% by weight of CM. NaOH may be used with optional further additives, such as sodium carbonate, to enhance the activation effect. It has been found that substitution of up to 40% by weight of the sodium hydroxide by $Na_2CO_3$ is very effective, and preferably up to 20% of the NaOh is substituted. Such optional further additives also may be selected from alkali or alkaline earth oxides, hydroxides or salts, or from any other compound which functions to activate the slag. Also preferred as an optional further additive are alkali metal polysilicates, such as a lithium sodium polysilicate or a lithium polysilicate. Another optional further additive is sodium fluoride, which may be used in amounts up to 2%, preferably up to 1%, more preferably 0.1 to 0.5% by weight of the CM.

When an optical cement is used with the slag, particularly portland cement, in effect the accelerator is at least partly comprised therein due to the CaO content of the cement being capable of activating the slag. Thus, in some formulations in which a cement is mixed with the slag, a separate accelerator such as NaOH may be omitted. However, although the formulations using a mixture of slag and cement without a separate accelerator can have low set time and low settlement, hardening time may be substantially increased. Where such an increase is found, and a shorter hardening time is needed for the particular application, a separate accelerator maybe used with the slag-cement mixture.

The slag employed in this invention is a byproduct obtained in the blast furnace process of smelting iron ore to produce iron. The slag is produced by a conventional process, utilizing grinding and separating steps well known in the art. A typical dry composition range and two further examples of slag are shown in Table 2 (weight percent):

TABLE 2

| | Composition | | | | | | |
|---|---|---|---|---|---|---|---|
| | $SiO_2$ | $Al_2O_3$ | CaO | MgO | FeO | S | $Mn_2O_3$ |
| Usual Range | 30–40 | 8–18 | 35–50 | 0–15 | 0–1 | 0–2 | 0–2 |
| Typical | 36.4 | 16.0 | 43.3 | 3.5 | 0.3 | 0.5 | <0.1 |
| Typical | 35.5 | 11.4 | 39.4 | 11.9 | 0.2 | 0.2 | — |

A high glass content, finely divided slag yields a grout having excellent sulfate resistance and readily controlled setting and hardening times in a relatively inexpensive formulation. High sulfate resistance is particularly important with regard to long term stability of the grouted formation. Grouting failures after five or ten years have been attributed to sulfate attack. The slag rich compositions of the present invention have long term stability in formations and are also useful in regrouting formations in which a previous grout has exhibited signs of failure. The grout is inexpensive because of the comparatively low cost of slag, a byproduct of iron production.

Properties of specific types of microfine cements which can be used in the present invention are shown in Table 3.

TABLE 3

| | Cementitious material | | | |
|---|---|---|---|---|
| | M1 Slag | M5 Slag/ Portland | W3W0 Portland | M3 Portland |
| Fineness ($cm^2$/gm) | 13000 | 9000 | 10000 | 11300 |
| Sp. Gr. (gm/$cm^3$) | 3.00 | 3.00 | 3.06 | 3.06 |
| Composition (wt %) | | | | |
| $SiO_2$ | 35.4 | 30.6 | 18.93 | 17.90 |
| $Al_2O_3$ | 16.0 | 12.4 | 18.93 | 4.93 |
| $Fe_2O_3$ | 0.3 | 1.1 | 3.78 | 3.48 |
| CaO | 43.3 | 48.4 | 61.57 | 61.63 |
| MgO | 3.5 | 5.8 | 2.96 | 2.59 |
| $K_2O$ | | | 0.64 | 0.68 |
| $Na_2O$ | | | 0.44 | 0.36 |
| $SO_3$ | 0.3 | 0.8 | 4.11 | 5.68 |
| L.O.I. (Loss on Ignition) 1000° C. | | | 2.40 | 2.90 |
| IR (Insoluble Residue) | | | 0.45 | 0.42 |
| TOTAL | 98.8 | 99.5 | 100.00 | 100.00 |

M5 is a mixture of slag and portland cement which is ground to the indicated degree of fineness after mixing. Thus, the slag and cement are co-ground. W3W is portland cement ground with a polymeric grinding aid and M3WO is portland cement ground without a grinding aid. M3W and M3WO are useful to produce slag/cement mixtures by mixing with microfine slag such as M1. The result is a mixture of individually ground microfine cements which therefore were not co-ground. In some cases there are advantages in using such slag/cement mixtures over co-ground mixtures. Individual grinding can be done in an optimum way for the specific slag and cement, but co-grinding tends to be an optimum procedure only for one of the components. By means of individual grinding, a very high degree of fineness can be obtained in the mixture. Furthermore individual grinding enables production of mixtures in which the fineness of the mixture can be easily varied to suit particular needs.

High level of penetration into a tight formation associated with high permanence renders the present invention valuable in many applications. One example is radioactive waste storage in shafts deep in rock formations where the present invention may be employed to permeate the rock around the waste for secondary containment.

It is a feature of the invention that cementitious material having the fine particle size and distribution described is formulated in a composition producing high strength grout having a readily controlled set time.

While slag or slag plus cement are preferably used without inert filler material, in some instances it may be desirable to incorporate limited amounts of other solids meeting the particle size specification specified for slag herein. Such other solids are clay, bentonite, kaolin, vermiculite limestone, silica flour, silica fume and other well known inert solids. The amount of these employed is to be minor so as not to reduce the strength of the set grout below desired values.

The dispersant is selected from materials used to disperse solids, preferably water-wetable solids, in aqueous systems. The dispersant serves to aid the penetration of water into the finely divided solids to produce a suspension of unassociated or unagglomerated particles. These dispersants are generally negatively charged or anionic electrolytes especially polyelectrolytes, such as polycarboxylates and polysulphonates. Examples include sodium ammonium salts of polymethacrylic acid, diisobutylenemaleic anhydride copolymer, copolymers of acrylic, methacrylic and maleic acids, organic phosphates, sulfonated naphthalene formaldehyde condensates, sulfonated natural products and other sulfonated polymer condensates.

The particle size of the materials is determined by a laser light scattering particles size distribution apparatus identified as a Microtrac ® particles size analyzer (Leeds and Northrup Instruments, North Wales, Pa. 19454). Measurements are made in the 0.7 to 125 micrometer range and are presented in terms of the volume of particles in size channels having a size ratio of approximately 1.4 between channels. Results are given as the percent larger than the stated size for each channel limit and the calculated volume surface area of the sample in square meters per cubic centimeter. The volume surface area can be converted to the specific surface, in square meters per gram, by dividing by the density of the material. Portland cement density is considered 3.15 grams per cubic centimeter as in ANSI/ASTM standard C104-78a; slag density is considered 2.92 grams per cubic centimeter.

Set time and settling are determined by the following general procedure:

1. The components are mixed in a plastic cup, as described in the hereinbelow Examples.
2. The mixture is colloidally agitated for 10 seconds by a high speed mixer.
3. The cup is tilted periodically while the CM surface is observed. When there is no flow or gross motion of the CM surface while the cup is tilted to 45 degrees the time is noted; this is the set time. Settling of the CM is observed; the percent of the total volume present as clear or cloudy surface liquid is reported as percent settlement.

Hardness development is monitored by measurement of the compressive strength and is reported along with the time of the measurement elapsed after sample preparation. The strength measurement employs a handheld penetrometer (Soiltest CL-700 Pocket Penetrometer, Soilest Inc., Chicago, Ill.) and follows the manufacturer's instructions. The penetrometer is held by its handle with the piston at right angles to the CM surface. With steady pressure the piston is pushed into the CM to the depth of the calibration groove about ¼ inch from the end of the piston. The compressive strength is read on the scale of the instrument.

It is advantageous to utilize slag as the cementitious material rather than portland cement in the grouting method and composition of the present invention, for several reasons. First, the slag component is available commercially in very finely divided form, such as the product described above which has a specific surface area of 14,000 $cm^2/g$; the slag is less costly, and offers the advantage of being non-polluting. However, the hydraulic reactivity of such slag is low, and a number of the intended applications require a reasonably fast set time and hardening time, that is, attaining desired strength in a reasonable time. Furthermore, in number of the intended uses for the present method and composition, it is important to obtain a low water permeability in the grouted formation. Thus, in such uses, a low percent settlement is desired (so that all the pores and openings in the formation being grouted are filled). The grouting composition desirably should exhibit a set time of below 6 hours, but not less than 0.5 hour. Preferably the set time is from 1 to 5 hours, more preferably from 1 to 4 hours and most preferably from 1 to 2 hours.

A desirable hardening time for the present invention is obtained when the strength of the grout is at least 4.5 $kg/cm^2$ within 20 hours, preferably is less than 10 hours and preferably in less than 6 hours.

The percent settlement desired depends on the intended use, and normally should be below 50% (volume). It is more desirable for percent settlement to be below 45%, with a settlement of 0-35% being more preferable and 0-10% settlement being most preferable.

However, the particular application of the present method and composition will determine the best choice of properties. For example, in situations involving water containment such as stabilizing or containing hazardous waste, low percent settlement is desired and for this purpose the water/CM (WC) ratio may be chosen to be low in water. For uses which involve strengthening formations where water containment is not a problem, the WC may be chosen to be higher in water. A higher ratio means use of less of the CM component and therefore is less costly.

In addition to requirements imposed by the intended use, the nature of the formation must be considered. A formation having larger openings or pores to be grouted can be grouted with a composition having a low WC but a formation into which the grout can penetrate only wih difficulty, even with use of high pressure pumps, may require a higher WC to lower grout viscosity.

It is an advantage of the method and composition of the invention that the grout can be formulated to have the most desirable combination of these properties for the particular intended use and nature of the formation. The components of the grout may be selected to modify the properties as desired, and modification is also possible through use of optional additives.

For uses of the method in stabilizing or strengthening formations, a low WC is needed where high strength is needed in the grouted formation. However, in such uses, the permeability of the resulting grouted formation is usually is not a problem so that a low permeability does not have to be achieved. Furthermore, many situations involving stabilization do not also call for high strength in the formation. For example, if a formation is to be stabilized for tunnel excavation, some strengthening of the formation is desired but not so as to make excavation difficult. As a result, a higher water proportion in the WC canbe employed. For stabilizing and strengthening formations, it is preferred in the method and composition of the present invention to use a WC in the range of 1:1 to 10:1 by weight.

When the method is used to stabilize hazardous waste or nuclear materials, an important requirement is low permeability of the resulting grouted formation. In such uses, or other uses involving containment of water, it is desirable to employ a WC in the range of 0.5:1 to 2:1 by weight. Normally, the appropriate grout would give permeability rates of from $10^{-6}$ to $10^{-9}$ cm/sec rate of flow of water.

The ultrafine ground slag used in the present method and composition is advantageous over the use of ordinary portland cement because it is available in a much finer particle size distribution at lower cost. As a result, compared with portland the present slag enables the grouting operation to proceed with a grout having considerably lower viscosity and particle size than known grouts.

Because of its large particle size, ordinary portland will not penetrate course sand. Microfine portland/slag (M5) will penetrate fine sand at 130 ml in 5 minutes as compared with the present invention (M1) which will penetrate the same fine sand at 600 ml in 11 minutes. This demonstrates the considerable advantage of the present invention over existing technology.

In previous attempts to use microfine ground slag in combination with cement for grouting, there have been problems in obtaining a composition which had a low enough viscosity to meet fast penetration requirements and which also had a combination of the other desired properties discussed above. It was known (see the above-mentioned W. J. Clarke ASCE preprint 84-023) to combine microfine cement in combination with sodium silicate for underground water control. However, this is a two component system (two separate mixtures in appropriate containers required at the site) as compared to the more effective one component mixture used in the present invention. Furthermore, it was necessary to include portland cement in such mixtures for hydraulic reactivity and the grout was not strong (it is weakened by the high content of sodium silicate). Although it was possible to obtain 0% settlement with such grouts, they have a problem of very fast set time, typically 1-3 minutes, which interferes with or prevents injection of grout into formations.

It has been found in the present invention that set time, hardening time and percent settlement properties can be obtained within the present desired limits, and can be further lowered by a specially preferred method of formulating the grout composition. It has been discovered that properties can be improved by following a special sequence of mixing components of the composition. In this embodiment of the invention, the dispersant component is first added to water and mixed to the extent necessary to form a solution or suspension, which will be referred to herein as a first mixture. To this first mixture there is then added the microfine slag component or the mixture of microfine slag with a cement, thereby forming a second mixture, which can be stirred or agitated to the extent necessary to insure contact of the dispersant with a substantial portion of the slag particles. Then, the accelerator is added to the second mixture. The resulting composition is subjected to strong agitation such as colloidal mixing or mixing in a high speed blender, to break up particle agglomerates. Optional additional dispersants are added at the time of forming the first mixture, and additional optional accelerators are added at the time of adding the specified accelerator to the second mixture.

In case no separate accelerator additive is used, and this function is fully served by mixing very finely divided portland cement with the slag, the preferred sequence for mixing the components is to first add a dispersant to water to form a first mixture. This mixture may be stirred or agitated if necessary to dissolve or disperse the dispersant. Then the mixture of slag and portland cement is added to the first mixture to form a second mixture. This second mixture may be immediately subjected to strong agitation as described for the embodiment in which only slag is used as the CM.

It has been found that the preferred sequence of addition provides enhanced and advantageous properties in the grout which then is ready for use. If the accelerator is added to the water and dispersant before addition of slag it is believed that there is a detrimental effect on the dispersant. Adequate dispersing of the slag particles is not achieved and agglomerates become a problem. Reversing the preferred sequence of mixing in these ways will prevent attaining optimum properties in the grout.

However, in some cases it may be necessary to add components in a way not in accordance with the preferred sequence of addition, for example in cases where an optional additional accelerator is used. It is also undesirable to add the dispersant last, i.e. after the accelerator is added.

In another embodiment of the invention, it has been found that an improvement in one or more of the properties of set time, hardening time or percent settlement can be obtained by selection of sodium hydroxide as the accelerator, in a particular proportion range. The use of sodium hydroxide as an accelerator for slag is known. However, it has been thought necessary to minimize the amount of sodium hydroxide both for reasons of cost and because of expected adverse effects on the grout or on the formation or structure which is grouted. However, surprisingly, it has been found that a decrease in one or more of the set time, hardening time or percent settlement can be achieved by using at least 5% sodium hydroxide by weight of the slag. Further improvements can be achieved by increasing sodium hydroxide up to about 10%. Higher amounts than 10% may be utilized but are not economical and very high amounts may affect the formations. The use of 5-10% of sodium hydroxide enables a higher WC to be employed while still obtaining grout properties within desired limits. Up to 40% by weight of the sodium hydroxide may be substituted by $Na_2CO_3$ with excellent results. Preferably up to 20% by weight of the sodium hydroxide is replaced, when $Na_2CO_3$ is used.

The present invention is illustrated in the drawings wherein FIG. 1 is a ternary phase diagram illustrating the relative proportions of calcium, aluminum and silicon oxides. Areas are shown representing blast furnace slag 1 with M1 microfine slag 2 located therein, M5 microfine slag/cement 3, portland cement 4, fly ash 5 and alumina cement 6.

Figure 2:
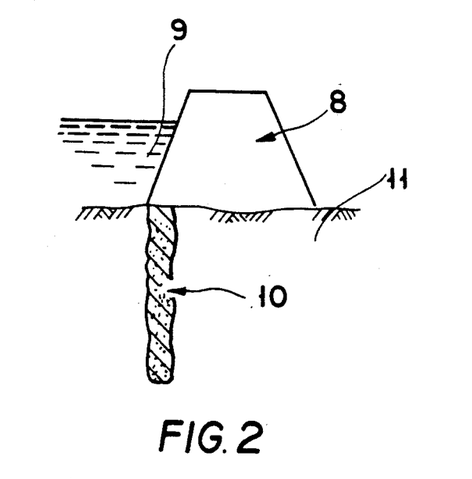
FIG. 2 schematically illustrates a sectional elevation showing dam curtain grouting.

A dam curtain grouting is schematically shown in FIG. 2 in which a dam 8 holds back water 9. Curtain grouting 10 is located within formation 11 and serves to contain water permeating from dammed water 9. The curtain grouting may be an older portland cement curtain through which water now permeates. The openings in the original grouting are closed by grouting in accordance with the method of the present invention so that the original curtain grouting is restored to an impermeable state.

Figure 3:
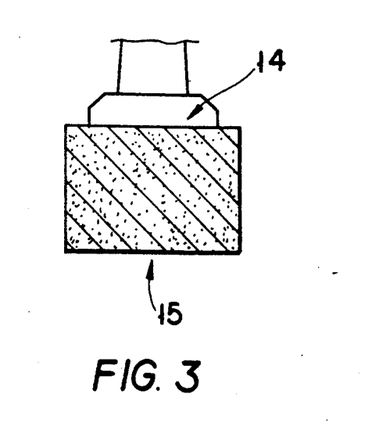
FIG. 3 schematically illustrates a sectional elevation of foundation grouting.

FIG. 3 illustrates strengthening a formation beneath a foundation 14. Formation 15 is grouted by the method of the present invention.

Figure 4:
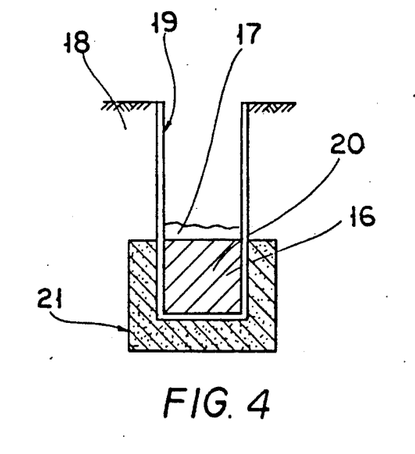
FIG. 4 schematically illustrates a sectional elevation showing nuclear waste containment.

Nuclear waste containment is illustrated in FIG. 4. Nuclear waste 20 is contained in containers 16 immobilized by portland cement 17. The immobilized containers are contained within shaft 19 which may be lined with metal or concrete. The shaft is shown out of proportion but actually is a very deep shaft in rock formation 18. The rock around the shaft is grouted 21 for secondary containment protection.

Figure 5:
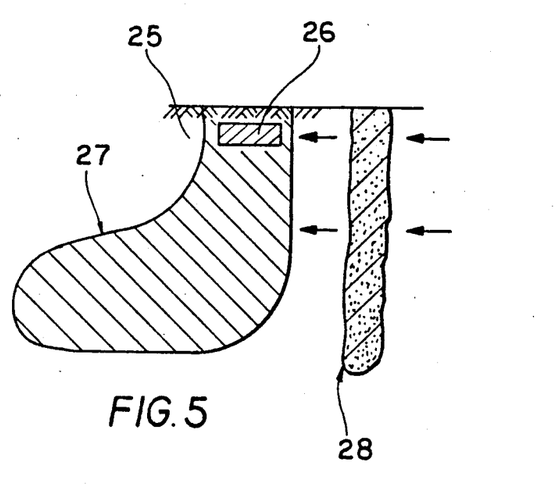
FIG. 5 schematically illustrates a sectional elevation showing stabilization of hazardous waste.

FIG. 5 illustrates stabilization of hazardous waste. Hazardous waste 26 is present in a formation 25. Surface water and water from the water table flows in the direction of the arrows, and leaches the hazardous waste, forming hazardous waste plume 27. The hazardous waste is contained by curtain grouting 28 to minimize further contamination.

Figure 6:
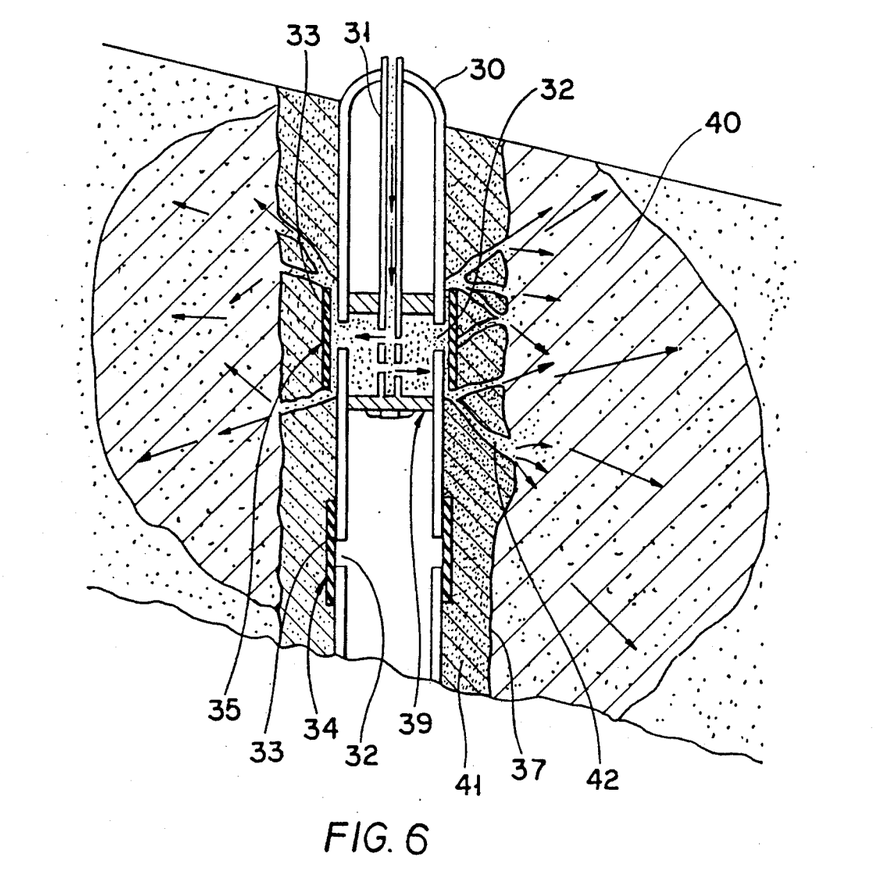
FIG. 6 is a diagrammatic sectional illustration of tube-a-machette grout injection.

FIG. 6 schematically depicts a tube-a-machette system for injection of grout into a formation, which may be employed in the method of present invention. A grout pipe 30 is installed in borehole 37. Lean cement grout 41 fills the space between grout pipe 30 and the wall of borehole 37. Grout pipe 30 has a plurality of ports 32 closed by tight-fitting rubber sleeves 33, acting as a check valve. Sleeve 33 is shown in closed position 34 and open position 35. Injection tube 31 moves double-ended packer 39 which isolates individual ports 32, permitting injection through isolated ports at specific depths. A grouting composition used in the present invention is injected through pipe 31 as shown by arrows. The grout is pumped under pressure which moves sleeve 33 away from port 32. The grout under pressure breaks through lean cement grout 41 into passage 42. In this way the grout is injected into the formation as shown by arrows, and forms a spreading grout region 40.

An alternative procedure is to drill the borehole while inserting a 3 inch steel casing during drilling. Upon completion of the borehole, the drill is removed and the steel casing remains in the borehole. The interior of the casing is filled with a lean cement grout (high water content). The above-described tube-a-machette is inserted into the casing while the lean grout is fluid, and then the casing is removed. The lean grout is allowed to harden, whereupon it seals the annular space around the tube-a-machette. The lean cement grout fractures when subjected to the impact of high pressure grout being injected through the ports of the tube-a-machette.

The injection procedure is used to form a grout curtain upstream of the hazardous waste plume. This may be done by boring a row of sufficiently deep holes, such as 80-100 feet deep, in a single row, spaced so that the spreading grout from each borehole will overlap with the next. Another procedure is to space boreholes in a single row on 20 foot centers. Type V portland cement is injected into those boreholes. Between each such borehole a centered further borehole is drilled and injected in accordance with the above procedure using the method of the present invention. The space between the portland cement injected borehole and the slag injected borehole can again be split with a further centered borehole injected in accordance with the present method. To further contain the flow of water, a second or a second and a third row of injected boreholes can be formed thus establishing the grout curtain. The ends of the grout curtains can be extended in a downstream direction to enclose the sides of the hazardous waste site. It is also possible, where necessitated by hazardous waste conditions, to entirely enclose the perimeter of the hazardous waste site with such grout curtains and in some situations grout can also be extended beneath the hazardous waste site.

The following examples are included to illustrate the invention.

| Definitions of symbols used in the examples: | |
|---|---|
| W | Water |
| CM | Cementitious material |
| M1 | Slag ground to 14,000 cm² SSA |
| M3W | Microfine portland cement ground with a polymer grinding aid to 11,300 cm²/g SSA |
| M3W0 | Microfine portland cement ground without a grinding aid to 10,000 cm²/g SSA |
| M5 | Microfine portland/slag co-ground to 8,880 cm²/g SSA |
| C6 | Dispersant, 3000 MW polyacrylic acid copolymer |
| N2 | Dispersant, naphthalene sulfonate formaldehyde condensate |
| FL | Accelerator, a 50% aqueous solution of calcium nitrate (Sika Corp., Lyndhurst, N. J.) |
| HE | Accelerator, a 30% aqueous solution of calcium chloride (Sika Corp, Lyndhurst, N. J.) |
| D | Dispersant |
| DCI | Corrosion inhibitor, a 30% aqueous sodium nitrate solution (W. R. Grace Co.) |
| 4180 | Dispersant, a copolymer of acrylic acid |
| M | Microfine slag, slag/cement or portland cement |
| WC | Weight ratio of water to cementitious material |
| A | Accelerator |
| LiS | Accelerator, lithium sodium polysilicate, available from Lithium Corporation of America, (lithsil S), a typical analysis of this product being: Li₂O (1.8) Na₂O (1.2) SiO₂ (19.6), 22.6% solids |
| Li6 | Accelerator, lithium polysilicate, available from Lithium Corporation of America, (lithsil 6), a typical analysis of this product being: Li₂O (2.2) SiO₂ (20.7), 22.9% solids |

Example 1 gives data on the properties of grout injected by the method of the invention. Neat grout is the grout in absence of sand, such as when injected into a rock formation.

In Examples 2 to 7, compositions were prepared with components as shown under "COMPONENTS-MIXING ORDER"; The components were mixed in the order indicated by reading the symbols from left to right, except as otherwise explained. For example, in Example 2, run 70al, 100 g water was mixed with 0.5 g C6 dispersant, and 50 g M1 slag then were added with mixing. 5 g NaOH (50% by weight) were added and the mixture was agitated in a high speed blender. For simplicity, amounts of water and slag or cement are shown as the proportion of water to cementitious material by weight, and all other components as a percentage of the weight of total cementitious material.

Measurements of set time and strength are given for the condition of the grout at the time of the measurement and elapsed time is reported as the period from the end of mixing the components until the time of the measurement.

Components were mixed at ambient temperatures, generally normal room temperature except where different temperatures are shown.

A typical experimental procedure is outlined for run 76b in Example 5 as follows;

1. 100 grams of water are weighed into a 4 ounce plastic cup with cap. pH and temperature of water an recorded using a portable Hach One pH meter model 43800-00 by Hach Company, Loveland, Colo.
2. Plastic cup is tared and 5 grams of C6 dispersant are added to water and mixed. pH and temperature are recorded.
3. 50 grams of M1 microfine cement are added to water, cap applied, sample shaken and pH/temperature recorded.
4. 5 grams of 50% NaOH are added, shaken and pH/temperature recorded.
5. 5 grams of 100% LiOH are added, shaken and pH/temperature recorded.
6. Contents of cup are shaken, poured into Osterizer Model 869-15H and blended at high speed for 10 seconds. pH/temperature recorded and cup is labeled, dated, timed.
7. Set time 12 hr is measure of intitial set as surface of M2 not moving when cup is tilted 45 degrees.

8. Measure unconfined compressive strength using Soiltest Pocket Penetrometer CL-700 at increasing times until strength exceeds 4.5 kg/cm$^2$... the limit of testing instrument.
9. Percent Settlement is measured after 12 hours as linear measurement from top of water to top of M1 surface as percent settlement, e.g., ½ supernatant and ½ M1 is 50% settlement.

EXAMPLE 1

| Material Tested | |
|---|---|
| Ottowa 20-30 sand | U.S. Silica Company, IL |
| MC-100 microfine cement (M1) | Blue Circle Atlantic Baltimore, MD |
| MC-500 microfine cement (M5) | Onoda Cement, Tokyo, Japan |
| Ordinary Portland (OP) | Chicago, IL |
| M3W0 microfine portland (223) | Heracles Cement, Athens, Greece |
| M3W microfine portland (224) | Heracles Cement, Athens, Greece |

Particles Size and Composition

TABLE 4

Particle Size Distribution of Ottowa 20-30 Sand, M1, M5, OP

| | Grain Size (mm) | | | |
|---|---|---|---|---|
| Percent Finer (wt) | 20-30 Sand | M1 | M5 | OP |
| 100 | 0.840 | 0.0070 | 0.0100 | 0.070 |
| 80 | 0.550 | 0.0040 | 0.0057 | 0.027 |
| 60 | 0.520 | 0.0026 | 0.0037 | 0.017 |
| 40 | 0.500 | 0.0017 | 0.0023 | 0.008 |
| 20 | 0.480 | 0.0010 | 0.0014 | 0.003 |
| 0 | 0.420 | 0.0007 | 0.0008 | 0.009 |

Neat Sample Preparation

1. Add 5 grams of N2 to 500 grams of water and mix.
2. Add 500 grams of M5, shake and disperse in Hamilton Beach high speed mixer for one minute.
3. Pour mix into pre-slit PVC pipe, one inch ID by one foot long.
4. After desired curing time, open slits, remove sample and cut in 2 inch lengths, trim and smooth end faces.

Grout Injection Mold Preparation

1. Use ASTM Standard D4320-84 for grout injection mold set up.
2. Use three piece split mold, 38 mm ID by 96 mm long segmented 120 degrees each, rubber gasket and glued along segments.
3. Three hose clamps are spaced equally along cylinders to compress gaskets.
4. End of cylinders are seated with round rubber gaskets, placed in end plates ready for filling with sand.
5. To allow easy flow of grout without moving sand particles, place perforated plastic disc and filter mesh in bottom of mold.
6. Air dired 20-30 Ottowa Sand is poured into mold in three equal layers compressed at each layer with a 320 gram cylinder.
7. Using a hand-held Burgess Vibrotool, each layer of sand is vibrated for one minute until cylinder is filled.
8. A filter mesh (70 mesh polyester screen) and a perforated disc (12-1/16th inch diameter holes) and rubber gasket are placed on the sand. End plate is secured by tightening tie bolts.
9. Samples prepared by this procedure give consistant results in void ratio (average 0.52) and relative density at this void ratio is 80%.

Grout Injection Procedure

1. Samples are wetted by injection water through sample bottom at 1 psi for one minute and soaked for 15 minutes.
2. One liter batches of M5 were prepared with one percent N2 on M5 and 1:1 WC ratio. Batch mixed in a Waring Blender for one minute before transferring to a two liter pressure tank.
3. Grout injection set up consists of six sample cylinders, holding tank and pressure regulator.
4. Grout flow is started by placing 2 psi air in holding tank. Grout flow is stopped when 200 ml is passed through each sand cylinder. Samples are held in molds for three days curing.

Unconfined Compression Test

1. Use ASTM Standard D4129 for testing M5 with strain rate of 0.2 mm/min.
2. Unconfined compressive strength of neat M5 in 3, 7 and 28 days is outlined in Table 5.
3. Effect of curing time on strength of neat M5 and OP is shown in Table 6.
4. Effect of curing time on strength of M5 grouted sand at various WC ratios is shown on Table 7.

TABLE 5

Stress Strain Data for Neat Grout

M5 (WC 1:1, 1% N2 on M5)
Strain Rate 0.2 mm/min

| | 3 day | 7 day | 28 day |
|---|---|---|---|
| Strength (kg/cm$^2$) | 68 | 163 | 234 |
| Strain (%) | 1.30 | 1.05 | 0.95 |

TABLE 6

Effect of Curing Time on Strength of Neat M5 and OP.

M5 (WC 1:1, 1% N2 on M5)
Strain Rate 0.2 mm/min
Strength (kg/cm$^2$)

| | 3 day | 7 day | 28 day | 60 day |
|---|---|---|---|---|
| M5 | 57 | 170 | 240 | 290 |
| OP | 80 | 133 | 190 | 210 |

TABLE 7

Effect of Curing Time on Strength of Grouted Sands.

M5 (WC 1:1, 2:1, 3:1, 1% N2 on M5)
Strain Rate 0.2 mm/min
Strength (kg/cm$^2$)

| | 7 day | 14 day | 28 day | 60 day |
|---|---|---|---|---|
| M5 (WC 1:1) | 110 | 128 | 162 | 202 |
| M5 (WC 2:1) | 27 | 36 | 49 | 63 |
| M5 (WC 3:1) | 8 | 13 | 18 | 24 |

Creep Test Procedure

1. Creep test of M5 grouted sand was performed using standard procedures on creep testing equipment.
2. Percent Strain verses time of M5 grouted sand is shown in Table 8.

TABLE 8

Creep of M5 Grouted Sand

| | Strain (%) | | | | | | | | |
|---|---|---|---|---|---|---|---|---|---|
| | Days | | | | | | | | |
| | 0 | 20 | 40 | 60 | 80 | 100 | 120 | 140 | 160 |
| D = 0.7 | .1 | .19 | .20 | .22 | .25 | .26 | .27 | .28 | .29 |

TABLE 8-continued

Creep of M5 Grouted Sand

| | Strain (%) Days | | | | | | | | |
|---|---|---|---|---|---|---|---|---|---|
| | 0 | 20 | 40 | 60 | 80 | 100 | 120 | 140 | 160 |
| D = 0.8 | .65 | .68 | .70 | .72 | .73 | .74 | | | |

D = Percent of failure load of M5 grouted sand

Permeability Test Procedure

1. Permeability of M5 grouted sand was performed using standard procedures with triaxial permeability cells.
2. Effect of curing time on permeability of M5 grouted sand at 1:1 and 3:1 WC ratio is shown in Table 9.

TABLE 9

Effect of Curing Time on Permeability of Grouted Sand
M5 (WC 1:1 and 3:1, 1% N2 on M5)

| | Permeability (cm/sec) | | |
|---|---|---|---|
| | 4 day | 7 day | 20 day |
| WC 3:1 | $10^{-5}$ | $10^{-5.1}$ | $10^{-5.2}$ |
| WC 1:1 | $10^{-7.2}$ | $10^{-7.4}$ | $10^{-7.5}$ |

EXAMPLE 2

In all compositions of this example (except for run 70l, see note (6)), the dispersant was C6 in an amount of 1.0% based on the weight of the slag component (in run 70c it was 1.1%). The accelerator in all runs was NaOH in % by weight of CM as shown.

| RUN | COMPONENTS & MIXING ORDER | CM | WC | NaOH % | SET- hours | STRENGTH S: kg/cm² H: hours | SETTLEMENT vol. % |
|---|---|---|---|---|---|---|---|
| 70a1 | WDMA | M1 | 2:1 | 5 | 3 | S: >4.5 H: 18 | 50 |
| 70a | WDAM (1) | M1 | 2:1 | 5 | 9 | S: >4.5 H: 18 | 50 |
| 70b | WDAM (2) | M1 | 2:1 | 5 | 9 | S: >4.5 H: 18 | 50 |
| 70c | WDMA (3) | M1 | 2.2:1 | 5.6 | 9 | S: >4.5 H: 31 | 50 |
| 70h | WDMA | M1 | 1:1 | 5 | 1 | S: <4.5 H: 4 | 0 |
| 70i | WDMA | M1 | 0.9:1 | 5 | 1.1 | S: >4.5 H: 4 | 0 |
| 70j | WDMA | M1 | 0.8:1 | 5 | 1 | S: >4.5 H: 4 | 0 |
| 70k | WDMA (4) | M1 | 0.9:1 | 5 | 3 | S: >4.5 H: 18 | — (5) |
| 70l | WDMA (6) | M1 | 1:1 | 5 | 2 | S: >4.5 H: 18 | 2 |

(1) 1.0% FL accelerator added, and to avoid precipitating it, both FL and NaOH were added before M1.
(2) 1.0% HE accelerator added, and to avoid precipitating it, both HE and NaOH were added before M1.
(3) 5.6% CaO accelerator added with the NaOH after M1.
(4) 10.0% DCI added after M1.
(5) no observation made.
(6) 4180 dispersant in an amount of 1% was used in place of C6.

COMMENTS

Runs 70a1, a and b: Accelerators HE and FL caused precipitation and opalescence, therefore, NaOH was added before M1. 50% settlement and extended set time are unsatisfactory... CaO gave same results.

Runs 70h to k: Low WC at or lower than 1.1 is required for hazardous waste containment to obtain 0-5% settlement. Low settlement and complete void filling are required to obtain very low formation permeabilities ($10^{-6}$ to $10^{-8}$ cm/sec) for hazardous waste and nuclear waste containment.

EXAMPLE 3

The effect of different accelerators on different CM components is compared. In runs 70a-d the dispersant was 1% C6, and in 70e-i it was 1% N2.

| RUN | COMPONENTS & MIXING ORDER | CM | WC | NaOH % | SET- hours | STRENGTH S: kg/cm² H: hours | SETTLEMENT vol. % |
|---|---|---|---|---|---|---|---|
| 74a | WDMA | M1 | 2:1 | 10 | 2.5 | S: >4.5 H: 26 | 10 |
| 74b | WDMA (1) | M1 | 2:1 | 10 | 2.0 | S: >4.5 H: 25 | 5 |
| 74c | WDMA (2) | M1 | 2:1 | 10 | >4.0 | S: >4.5 H: 24 | 25 |
| 74d | WDMA (3) | M1 | 2:1 | 10 | 2.0 | S: >4.5 H: 24 | 5 |
| 74e | WDMA (1) | M5 | 2:1 | 0 | 2.0 | S: >4.5 H: 91 | 35 |
| 74f | WDMA (4) | M5 | 2:1 | 0 | >10.0 | S: >4.5 H: 37 | 35 |
| 74g | WDMA (3) | M5 | 2:1 | 0 | 10.0 | S: >4.5 H: 90 | 45 |
| 74h | WDMA (5) | M1 & | 5:1 | 0 | 0.02 | S: >4.5 | 0 |

-continued

| RUN | COMPONENTS & MIXING ORDER | CM | WC | NaOH % | SET- hours | STRENGTH S: kg/cm² H: hours | SETTLE- MENT vol. % |
|-----|---------------------------|----|----|--------|-----------|----------------------------|---------------------|
| 74i | WDMA (5) | M3W 1:1 M1 & M3W0 1:1 | 5:1 | 0 | 0.02 (1.2 Min) (1.3 Min) | H: 90 S: >4.5 H: 88 | 0 |

(1) 1% LiOH accelerator added after CM.
(2) 1% sodium tetraformate added before CM (since a viscous black precipitate forms when added after CM).
(3) 1% NaF was added after CM, as an accelerator.
(4) 1% sodium tetraformate was added after CM.
(5) A 2 component system was prepared; as a first component, 60 g water, 0.2 g N2 dispersant and 20 g CM as shown above; as a second component, 38 g $Na_2SiO_2$ and 40 g water. The two components were then mixed.

COMMENTS

Runs 74a–d: The effect of the additional accelerators may be masked by the high (10%) NaOH content (see Example 5, runs 76b–d where NaOH is 5%).

Runs 74e–g: Accelerators as 1% of M5 did not decrease hardening time or % settlement as required.

Runs 74h–i: These rums are included for comparison, and represent use of a 2 component high $Na_2SiO_2$ content system not in accordance with this invention. It is of interest that M3W and M3WO microfine portland cements operated satisfactorily with 50% M1 in the two component system with $Na_2SiO_2$.

EXAMPLE 4

This was a study of the effect of one percent increments of NaOH on compositions employing M1 as CM.

below 5 percent NaOH, with a cloudy supernatant, long set times and long hardening times.

Runs 75g–k: Increasing NaOH to 5% gave significant improvements, and use of 7–10% NaOH resulted in unexpected clear supernatant, reduced settlement to 15%, reduced set time to 4 hours and reduced hardening time to 14 hours. These are very significant improvements.

EXAMPLE 5

In runs 76b–d, additional accelerators were tested for effect on M1 in the presence of NaOH at a 5% level. The effects of NaOH at varying WC ratios and different dispersant amounts were studied (runs 76e–g and i). In run 76h the sequence of addition of NaOH was tested by adding NaOH before M1. Runs 76j and k test compositions having microfine portland cement as the sole CM; these runs are not in accordance with the present

| RUN | COMPONENTS & MIXING ORDER | CM | WC | NaOH % | SET- hours | STRENGTH S: kg/cm² H: hours | SETTLE- MENT vol. % |
|-----|---------------------------|----|----|--------|-----------|----------------------------|---------------------|
| 75a | WDM | M1 | 2:1 | 0 | 8 (1) | S: >4.5 H: 168 | 40 |
| 75b | WDMA | M1 | 2:1 | 1 | 6 (1) | S: >4.5 H: 44 | 70 |
| 75c | WDMA | M1 | 2:1 | 2 | 6 (1) | S: >4.5 H: 44 | 70 |
| 75d | WDMA | M1 | 2:1 | 3 | 6 (1) | S: >4.5 H: 44 | 60 |
| 75e | WDMA | M1 | 2:1 | 4 | 6 (1) | S: >4.5 H: 44 | 60 |
| 75f | WDMA | M1 | 2:1 | 5 | 6 (1) | S: >4.5 H: 16 | 45 |
| 75g | WDMA | M1 | 2:1 | 6 | 5 | S: >4.5 H: 15 | 35 |
| 75h | WDMA | M1 | 2:1 | 7 | 5 | S: >4.5 H: 15 | 35 |
| 75i | WDMA | M1 | 2:1 | 8 | 4 | S: >4.5 H: 15 | 25 |
| 75j | WDMA | M1 | 2:1 | 9 | 4 | S: >4.5 H: 14 | 20 |
| 75k | WDMA | M1 | 2:1 | 10 | 4 | S: >4.5 H: 14 | 15 |

(1) Only a part (at the bottom) of the CM set.

COMMENTS

Runs 75a–g: NaOH is an important accelerator for use with pure M1 to initiate the alkali activated slag reaction. However, severe settlement was obtained and are included for purposes of comparison.

The dispersant was C6 in an amount of 1%, except for run 76g (1% before M1 plus another 1% after M1), run 76i (more, 4.0%), and runs 76j–k in which 1% N2 dispersant was used in place of C6.

| RUN | COMPO-NENTS & MIXING ORDER | CM | WC | NaOH % | SET- hours | STRENGTH S: kg/cm² H: hours | SETTLE- MENT vol. % |
|---|---|---|---|---|---|---|---|
| 76a | WDMA | M1 | 2:1 | 5 | 12 | S: >4.5<br>H: 22 | 60 |
| 76b | WDMA (1) | M1 | 2:1 | 5 | 12 | S: >4.5<br>H: 22 | 50 |
| 76c | WDMA (2) | M1 | 2:1 | 5 | 22 | S: >4.5<br>H: 180 | 40 |
| 76d | WDMA (3) | M1 | 2:1 | 5 | 12 | S: >4.5<br>H: 76 | 15 |
| 76e | WDMA | M1 | 2:1 | 7.5 | 5 | S: >4.5<br>H: 9 | 30 |
| 76f | WDMA | M1 | 2:1 | 10 | 4 | S: >4.5<br>H: 13 | 30 |
| 76g | WDMA (4) | M1 | 0.5:1 | 5 | 0.33 (20 Min) | S: >4.5<br>H: 2.5 | 0 |
| 76h | WDAM | M1 | 2:1 | 5 | 7 | S: >4.5<br>H: 17 | 40 |
| 76i | WDMA | M1 | 2:1 | 5 | 7 | S: 4.5<br>H: 27 | 50 |
| 76j | WDM | M3W | 2:1 | 0 | 8 | S: 4.5<br>H: 27 | 20 |
| 76k | WDM | M3WO | 2:1 | 0 | 8 | S: 4.5<br>H: 28 | 0 |

(1) 1% LiOH accelerator was added after M1.
(2) 0.68% NaTF (68 wt % sodium tetraformate in water) was added after M1.
(3) 1% NaF accelerator was added after M1.
(4) An additional 1% of C6 dispersant added after M1.

COMMENTS

Runs 76b–d: NaF gave significantly lower % settlement but long hardening time. LiOH and NaTF did not significantly lower % settlement and NaTF resulted in long hardening time.

Runs 76e–f: 7.5 and 10% NaOH gave fast set and hardening time but higher than expected % settlement.

Run 76g: 0.5/1 WC ratio gave a pasty mix when 5% NaOH was added. An additional 1% of C6 was added with slight viscosity reduction. This represents the practical low WC ratio for M1 with the current dispersant system.

Runs 76h: Addition of the NaOH accelerator before M1 showed better results than run 76a, the two runs being the same except for the changed sequence of mixing. However the better results in run 76h are believed to be accidental and not representative of field conditions because NaOH added to water and dispersant did not remain together for any length of time before addition of slag. The M1 was immediately added, apparently preventing any harmful reaction between NaOH and the dispersant. Under actual conditions of use in the field, NaOH added to the dispersant solution would remain there for a considerable time before addition of slag. Therefore this experiment was redesigned to provide an interval during which the water/dispersant/NaOH mixture remains standing before addition of M1. The redesigned test is reported in the following Example 6, runs 77a–c.

Run 76i: Increase in dispersant C6 to 4% increased set and hardening time but decreased settlement compared to run 76a. C6 has previously been optimized at 1% of M1.

Runs 76j–k: M3W and M3WO microfine portlands gave very low settlement but longer set and hardening times. Zero versus 20% settlement of M3WO and M3W showed the superior suspension properties of M3WO.

EXAMPLE 6

The effect of NaOH sequence of addition was tested in runs 77d–e at different standing times. Runs 77d–e test mixtures of M1 with M3 portland. The effects of lower temperatures (of the order of 10° C.) on compositions with varying NaOH accelerator concentrations were studied in runs 77f–k.

Preparation of the composition and storage during observation of grout properties was done at ambient temperatures (normally room temperature) in runs 77a–e and 77l. In runs 77f–k the compositions were prepared at temperatures below room temperature (averaging 10° C.), and storage during observation of grout properties was at 10° C.

In each of runs 77a–l the dispersant was C6 in an amount of 1%.

| RUN | COMPO-NENTS & MIXING ORDER | CM | WC | NaOH % | SET- hours | STRENGTH S: kg/cm² H: hours | SETTLE- MENT vol. % |
|---|---|---|---|---|---|---|---|
| 77a | WDMA | M1 | 2:1 | 5 | 4 | S: >4.5<br>H: 13 | 45 |
| 77b | WDAM (1) | M1 | 2:1 | 5 | 6 | S: >4.5<br>H: 19 | 50 |
| 77c | WDAM (2) | M1 | 2:1 | 5 | 6 | S: >4.5<br>H: 19 | 55 |
| 77d | WDM | M1 & M3W 1:1 | 2:1 | 0 | 4 | S: >4.5<br>H: 120 | 30 |

-continued

| RUN | COMPONENTS & MIXING ORDER | CM | WC | NaOH % | SET-hours | STRENGTH S: kg/cm² H: hours | SETTLEMENT vol. % |
|---|---|---|---|---|---|---|---|
| 77e | WDM | M1 & M3W0 1:1 | 2:1 | 0 | 4 | S: — (4) H: — | 20 |
| 77f | WDM | M1 | 2:1 | 0 | 6 (3) | S: >4.5 H: 21 | 70 |
| 77g | WDMA | M1 | 2:1 | 2 | 6 (3) | S: >4.5 H: 21 | 65 |
| 77h | WDMA | M1 | 2:1 | 4 | 6 (3) | S: >4.5 H: 24 | 65 |
| 77i | WDMA | M1 | 2:1 | 6 | 14 | S: >4.5 H: 24 | 55 |
| 77j | WDMA | M1 | 2:1 | 8 | 5 | S: >4.5 H: 24 | 50 |
| 7k | WDMA | M1 | 2:1 | 10 | 5 | S: >4.5 H: 19 | 30 |
| 77l | WDM | M5 | 2:1 | 0 | 3 | S: >4.5 H: 120 | 25 |

(1) NaOH was added to water and dispersant solution, and remained standing for 15 minutes before M1 was added.
(2) NaOH was added to water and dispersant solution, and remained standing for 30 minutes before M1 was added.
(3) Only a part (at the bottom) of the CM set.
(4) No observation (test sample lost).

COMMENTS

Runs 77a–c: Sequence of addition change with NaOH and C6 dispersant in contact for 15 minutes (77b) and 30 minutes (77c) before M1 added showed all properties of the grout decreased compared with 77a in which NaOH was added after M1. This unexpected phenomenon is believed to be very significant.

Runs 77d–e: 50% M3W and M3WO with M1 gave satisfactory % settlement and set time but long hardening time. This is a continuing problem with the portland/slag system including M5 portland/slag (see run 77l).

Runs 77f–k: Two percent increments of NaOH on M1 were tested at 10° C. to confirm that the alkali activated slag reaction continues at low temperature. Although the set and hardening times were extended, the reaction did take place with best results at 10% NaOH in 77k.

EXAMPLE 7

A number of optional accelerators, or promoters of slag activation, were tested for use in combination with NaOH.

| RUN | COMPONENTS & MIXING ORDER | CM | WC | NaOH % | SET-hours | STRENGTH S: kg/cm² H: hours | SETTLEMENT vol. % |
|---|---|---|---|---|---|---|---|
| 78a | WDMA | M1 | 2:1 | 5 | 8 | S: >4.5 H: 15 | 50 |
| 78b | WDMA (1) | M1 | 2:1 | 4 | 4 | S: >4.5 H: 14 | 30 |
| 78c | WDMA (2) | M1 | 2:1 | 3 | 2 | S: >4.5 H: 14 | 20 |
| 78d | WDMA (3) | M1 | 2:1 | 5 | 10 | S: >4.5 H: 30 | 30 |
| 78e | WDMA (4) | M1 | 2:1 | 5 | 10 | S: >4.5 H: 30 | 40 |
| 78f | WDMA (5) | M1 | 2:1 | 5 | 1.5 | S: >4.5 H: 31 | 10 |
| 78g | WDMA (6) | M1 | 2:1 | 5 | 3.5 | S: >4.5 H: 31 | 20 |
| 78h | WDMA (7) | M1 | 2:1 | 5 | 8 | S: >4.5 H: 19 | 45 |
| 78i | WDMA (8) | M1 | 2.2:1 | 5.5 | 9 | S: soft H: 42 | 55 |
| 78j | WDMA (9) | M1 | 2.2:1 | 5.5 | 9 | S: soft H: 42 | 50 |

Added accelerators or slag activation promoters (all percentages based on weight of M1 slag):
(1) 1% $Na_2CO_3$
(2) 2% $Na_2CO_3$
(3) 0.4% NaF
(4) 0.8% NaF
(5) 1.0% LiS (lithium sodium polysilicate)
(6) 1.0% Li6 (lithium polysilicate)
(7) 1.0% 4130 (acrylic acid copolymer)
(8) 11.1% CaO added after NaOH
(9) 11.1% $CaOH_2$ added after NaOH

COMMENTS

Runs 78b–c: Substitution of $Na_2CO_3$ for part of the NaOH gave considerable improvement in set time, hardening time and % Settlement.

Runs 78d–e: 0.4% and 0.8% NaF gave a long set time and did not harden in 14 hours.

Runs 78f–g: Use of lithium sodium polysilicate or lithium polysilicate appears to be desirable since they gave a fast set time, medium strength and low settlement.

Runs 78i–j: 5% CaO and $Ca(OH)_2$ replacement of M1 gave high settlement and remained soft after 13 hours.

I claim:

1. In a method of grouting formations, which comprises injecting into a formation a composition, the improvement wherein the composition comprises:
   (a) water;
   (b) particulate slag comprising a microfine slag having a specific surface area greater than about 9,500 $cm^2/g$ with less than 3 wt. percent of the particles of said slag being larger than 7.8 micrometers in diameter; the proportions of water and slag being within a water to slag weight ratio of between 0.5:1 and 10:1;
   (c) at least one dispersant in an amount effective to disperse the particles of said particulate slag; and
   (d) an accelerator in an amount effective to provide hydraulic reactivity to said slag.

2. A method according to claim 1, wherein the slag has a specific surface area greater than about 11,000 $cm^2/g$ and less than about 1.5%, by weight, of particles of the slag are larger than about 7.8 micrometers in diameter.

3. A method according to claim 1, wherein the slag has a specific surface area greater than about 13,000 $cm^2/g$ with less than about 1.5% by weight of particles of the slag being over 7.8 micrometers in diameter.

4. A method according to claim 1, wherein the slag component (b) additionally has mixed with it a cement having a specific surface area greater than about 10,000 $cm^2/g$ with less than about 16 weight percent of particles of the cement being larger than 7.8 micrometers in diameter, the slag being at least 40% of the total weight of slag and cement.

5. A method according to claim 4, wherein the cement has a specific surface area greater than about 11,000 $cm^2/g$ and less than about 7% by weight of particles of the cement are larger than 7.8 micrometers in diameter.

6. A method according to claim 5, wherein the slag has a specific surface area of at least about 14,000 $cm^2/g$, the mixture of slag and cement having a specific surface area of at least about 12,000 $cm^2/g$.

7. A method according to claim 4, wherein the slag and the cement in the mixture were separately ground.

8. A method according to claim 4, wherein the cement is portland.

9. A method according to claim 4, wherein the cement activates the hydration of the slag and partly or fully replaces accelerator component (d).

10. A method according to claim 1 wherein the water to slag weight ratio is from 1:1 to 10:1.

11. A method according to claim 1 wherein the water to slag weight ratio is from 0.5:1 to 2:1.

12. A method according to claim 1, wherein the accelerator is an alkali or alkaline earth oxide, hydroxide or salt, which imparts hydraulic reactivity to the microfine slag.

13. A method according to claim 12, wherein an additional accelerator is included which is an alkali or alkaline earth oxide, hydroxide or salt, in an amount effective to impart hydraulic reactivity to the microfine slag or to enhance the activation of the slag.

14. A method according to claim 1, wherein the accelerator is NaOH in an amount of from 5% to 10% of the weight of the slag component.

15. A method according to claim 14, wherein an additional accelerator is included in an amount effective to impart hydraulic reactivity to the microfine slag or to enhance the activation of the slag, said additional accelerator being $Na_2CO_3$, NaF, or an alkali metal polysilicate.

16. A method according to claim 15, wherein the additional accelerator is $Na_2CO_3$ and replaces up to 40% by weight of the NaOH.

17. A method according to claim 16, wherein up to 20% of the weight of the NaOH is substituted.

18. A method according to claim 15, wherein the alkali metal polysilicate is a lithium sodium polysilicate or a lithium polysilicate.

19. A method according to claim 1, wherein the composition was prepared by mixing in sequence (a) with (c) to form a first mixture, adding the particulate slag of (b) to said first mixture to form a second mixture, then adding (d) to said second mixture, and subjecting the resulting composition to strong agitation.

20. A soil or rock formation or underground structure which has been grouted in accordance with the method of claim 1.

* * * * *